US008829870B2

(12) United States Patent
Mizutani et al.

(10) Patent No.: US 8,829,870 B2
(45) Date of Patent: *Sep. 9, 2014

(54) VOLTAGE CONVERSION APPARATUS AND ELECTRICAL LOAD DRIVING APPARATUS

(75) Inventors: Koichi Mizutani, Toyota (JP); Takayuki Naito, Okazaki (JP); Kouichi Yamanoue, Hiroshima (JP); Shigeki Yamamoto, Hiroshima (JP)

(73) Assignees: Toyota Jidosha Kabushiki Kaisha, Toyota (JP); Visteon Global Technologies, Inc., Van Buren Township, MI (US)

(*) Notice: Subject to any disclaimer, the term of this patent is extended or adjusted under 35 U.S.C. 154(b) by 143 days.

This patent is subject to a terminal disclaimer.

(21) Appl. No.: 13/322,771

(22) PCT Filed: Jul. 14, 2010

(86) PCT No.: PCT/JP2010/062285
§ 371 (c)(1),
(2), (4) Date: Nov. 28, 2011

(87) PCT Pub. No.: WO2011/016341
PCT Pub. Date: Feb. 10, 2011

(65) Prior Publication Data
US 2012/0119723 A1 May 17, 2012

(30) Foreign Application Priority Data
Aug. 3, 2009 (JP) ................. 2009-180951

(51) Int. Cl.
G05F 1/00 (2006.01)
H02M 3/158 (2006.01)
H02M 3/00 (2006.01)

(52) U.S. Cl.
CPC ............... H02M 3/158 (2013.01); H02M 3/00 (2013.01)
USPC ............ 323/271; 323/282; 361/748; 361/760

(58) Field of Classification Search
USPC ............... 323/271, 282, 351, 335; 363/147; 361/152, 156, 204, 748, 760, 763, 783
See application file for complete search history.

(56) References Cited

U.S. PATENT DOCUMENTS 6,300,679 B1 * 10/2001 Mukerji et al. ............... 257/738
6,518,868 B1 * 2/2003 Miller et al. ................... 336/55
(Continued)

FOREIGN PATENT DOCUMENTS

JP A-62-005695 1/1987
JP A-04-069060 3/1992
(Continued)

OTHER PUBLICATIONS

Written Opinion of the International Searching Authority issued in Application No. PCT/JP2010/062285; Dated Mar. 30, 2011.
(Continued)

Primary Examiner — Nguyen Tran
(74) Attorney, Agent, or Firm — Oliff PLC

(57) ABSTRACT

A voltage conversion apparatus is disclosed in which a current passes through first and second loop circuits alternately in accordance with ON/OFF operation of a first switching element provided in the first circuit. The direction of a magnetic field through the first loop circuit formed at the ON operation is the same as a direction of a magnetic field through the second loop circuit formed at the OFF operation. The first loop circuit and the second loop circuit are provided on opposite sides of a printed circuit board, respectively, in such a manner that the first loop circuit and the second loop circuit are opposed to each other. A heat sink is provided on a surface of the printed circuit board. A solid pattern of a metal material is provided on an inner layer of the printed circuit board to be connected to the heat sink via a through hole.

6 Claims, 12 Drawing Sheets

(56) References Cited

U.S. PATENT DOCUMENTS

| | | |
|---|---|---|
| 2007/0205038 A1* | 9/2007 | Tominaga et al. ............ 180/444 |
| 2008/0055862 A1* | 3/2008 | Yu ................................ 361/710 |
| 2011/0148370 A1 | 6/2011 | Mizutani et al. |

FOREIGN PATENT DOCUMENTS

| | | |
|---|---|---|
| JP | A-11-233904 | 8/1999 |
| JP | A-2000-287454 | 10/2000 |
| JP | A-2005-110452 | 4/2005 |
| JP | A-2007-274759 | 10/2007 |
| JP | B2 4963518 | 6/2012 |

OTHER PUBLICATIONS

International Search Report issued in Application No. PCT/JP2010/062285; Dated Mar. 30, 2011.

* cited by examiner

FIG.6A  I2
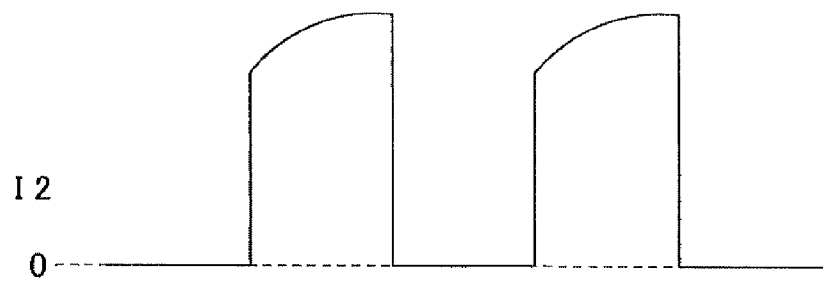
FIG.6B  I1
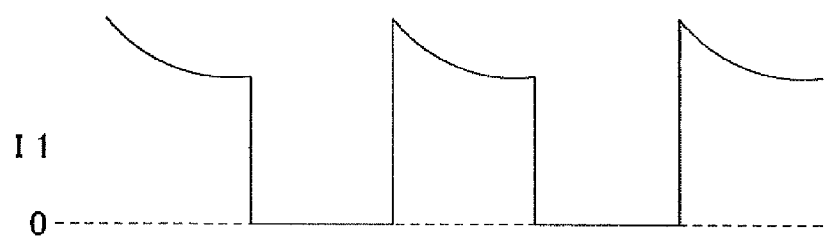
FIG.6C  φ2
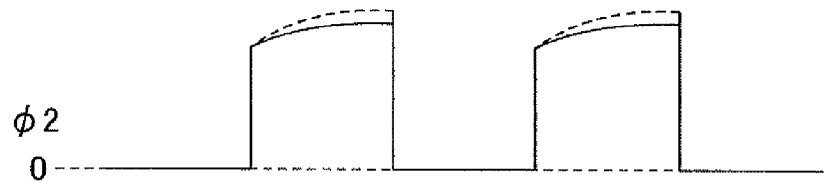
FIG.6D  φ1
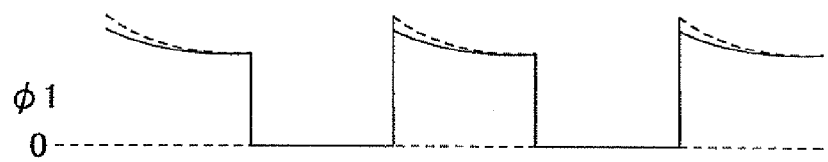
FIG.6E  φ2+φ1

VOLTAGE CONVERSION APPARATUS AND ELECTRICAL LOAD DRIVING APPARATUS

TECHNICAL FIELD

The present invention is related to a voltage conversion apparatus having a first loop circuit and a second loop circuit which share an inductance component and is also related to an electrical load driving apparatus which uses the voltage conversion apparatus.

BACKGROUND ART

JP2005-110452 discloses a switching power supply circuit having a primary circuit connected to a primary coil of a transformer and a secondary circuit connected to a secondary coil of a transformer, wherein an electrode pattern for the primary circuit and an electrode pattern for the secondary circuit are disposed such a manner that they are opposed to each other. An insulating layer between the electrode patterns functions as a dielectric for a capacitor and thus forms an equivalent capacitor. The equivalent capacitor functions as a capacitor for noise reduction.

A non-isolated DC-DC converter, for example, as shown in FIG. 1, is provided with a first loop circuit and a second loop circuit. The first and second loop circuits share an inductance L and have capacitors C1 and C2, respectively. A voltage conversion is implemented by turning on and off switching element Q1 or Q2 provided in the first or second loop circuit. During the switching, the first and second capacitors have functions of smoothing an output of the DC-DC converter and reducing a noise level generated by the DC-DC converter. Generally, such a circuit configuration as shown in FIG. 1 is implemented by providing the first and second loop circuits side by side on a common surface of a printed circuit board or providing the first and second loop circuits side by side on separate surfaces of a printed circuit board, as shown in FIG. 2.

However, in the conventional circuit configuration as shown in FIG. 1 and FIG. 2, when the first switching element Q1, for example, is operated to turn ON/OFF, the current passes through the first and second loop circuits alternately, and thus a magnetic field through the first loop circuit and a magnetic field through the second loop circuit are generated alternately. At that time, a direction of the current passing through the first loop circuit and a direction of the current passing through the second loop circuit are opposite to each other, as shown by arrows in FIG. 1, and thus a direction of the magnetic field through the first loop circuit and a direction of the magnetic field through the second loop circuit are opposite to each other. In such a configuration, magnetic fields in opposite directions are generated alternately for a short period due to a high-speed (short term) ON/OFF operation of the switching element Q1, resulting in a problem that noise is generated due to such a variation in the magnetic field.

DISCLOSURE OF INVENTION

Therefore, an object of the present invention is to provide a voltage conversion apparatus which can effectively radiate heat of switching elements while effectively reducing noise due to a variation in the magnetic field formed in the first and second loop circuits, and an electrical load driving apparatus which uses such a voltage conversion apparatus.

In order to achieve the aforementioned objects, according to the first aspect of the present invention a voltage conversion apparatus is provided which has a first loop circuit and a second loop circuit which share an inductance component, in which a current passes through the first and second loop circuits alternately in accordance with ON/OFF operation of a first switching element provided in the first circuit, wherein a direction of a magnetic field through the first loop circuit formed at the ON operation of the first switching element in the first loop circuit is the same as a direction of a magnetic field through the second loop circuit formed at the OFF operation of the first switching element in the first loop circuit subsequent to the ON operation, the first loop circuit and the second loop circuit are provided on opposite sides of a printed circuit board, respectively, in such a manner that the first loop circuit and the second loop circuit are opposed to each other in a direction of the normal to the respective loop circuits, a heat sink is provided on a surface of the printed circuit board, and a solid pattern of a metal material is provided on an inner layer of the printed circuit board, said solid pattern being connected to the heat sink via a through hole.

According to the present invention, a voltage conversion apparatus and an electrical load driving apparatus using the same can be obtained, which voltage conversion apparatus can effectively radiate heat of switching elements while effectively reducing noise due to a variation in the magnetic field formed in the first and second loop circuits.

BRIEF DESCRIPTION OF THE DRAWINGS

These and other objects, features, and advantages of the present invention will become more apparent from the following detailed description of preferred embodiments given with reference to the accompanying drawings, in which:

FIGS. 6A-6E are diagrams of waveshapes for explaining a magnetic flux variation reduction effect in the voltage conversion apparatus 1 which adopts the circuit arrangement shown in FIG. 5;

EXPLANATION FOR REFERENCE NUMBER

Figure 1:
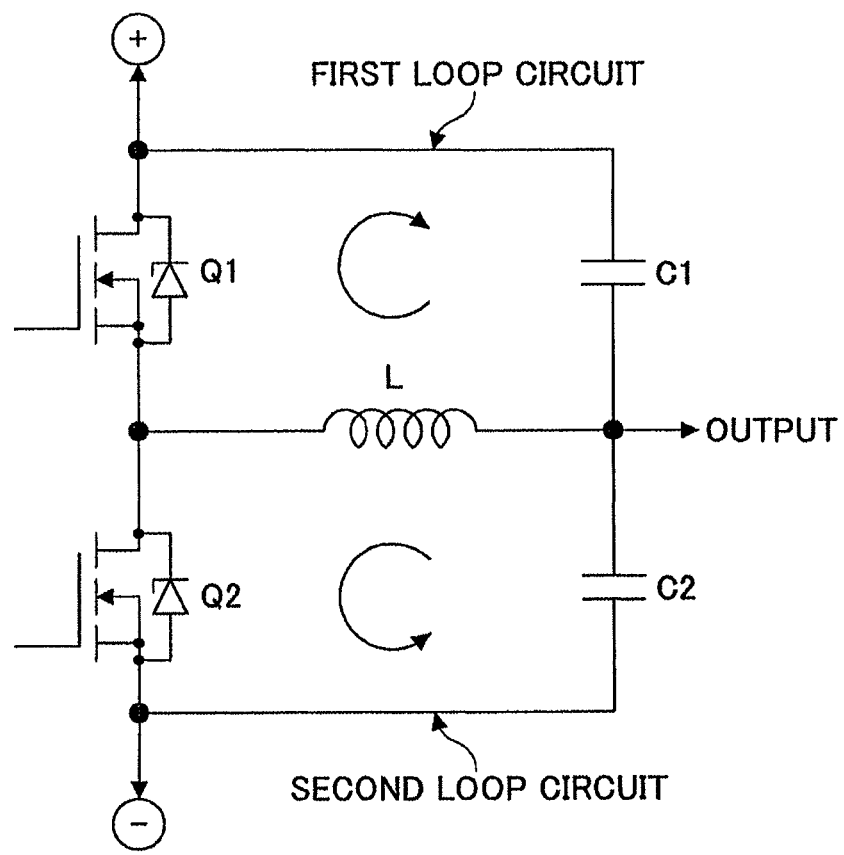
FIG. 1 is a diagram for illustrating a circuit configuration of a DC-DC converter according to prior art.

L inductance
C1 capacitor
C2 capacitor
Q1 switching element
Q2 switching element
1 voltage conversion apparatus
10 first loop circuit
12 second loop circuit
20 output terminal
40 electrical load
70 heat sink
72 through hole
80 printed circuit board
82 heat conductive layer
90 casing
203 direct-current power supply

BEST MODE FOR CARRYING OUT THE INVENTION

In the following, the best mode for carrying out the present invention will be described in detail by referring to the accompanying drawings.

Figure 3:
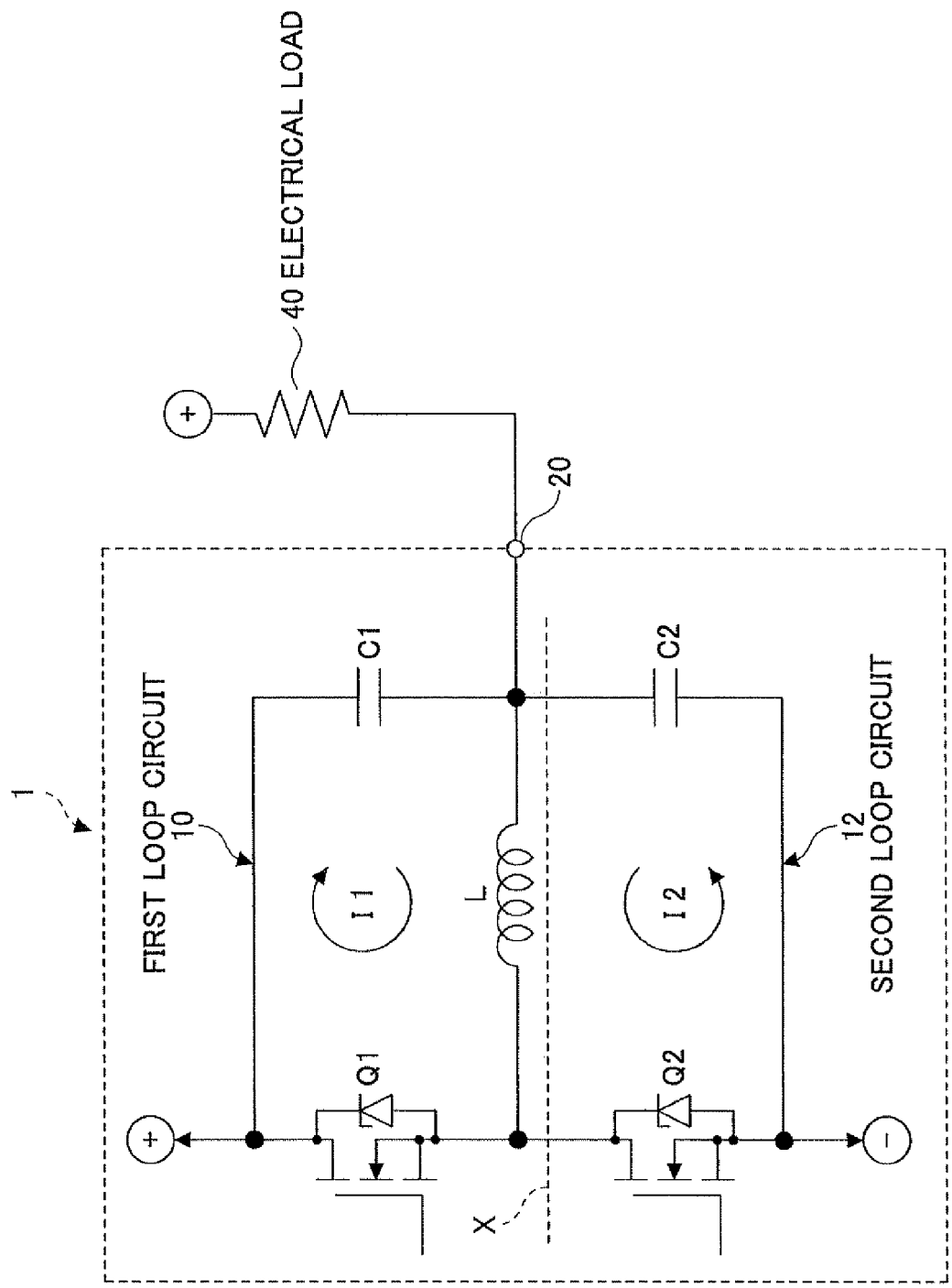
FIG. 3 is a diagram for illustrating a circuit configuration of a voltage conversion apparatus 1 according to one embodiment of the present invention.

FIG. 3 is a diagram for illustrating a circuit configuration of a voltage conversion apparatus 1 according to one embodiment of the present invention. The circuit configuration of the voltage conversion apparatus 1 according to the embodiment itself is equivalent to the circuit configuration of the conventional DC-DC converter shown in FIG. 1.

Specifically, the voltage conversion apparatus 1 is a non-isolated DC-DC converter employing synchronous rectification. The voltage conversion apparatus 1 has first and second loop circuits 10 and 12. An output terminal 20 of the voltage conversion apparatus 1 is connected to an electrical load 40 to be driven. The first and second loop circuits 10 and 12 share an inductance L.

The first loop circuit 10 has a switching element Q1 and a capacitor C1 in addition to the inductance L. The switching element Q1 is a MOSFET (metal oxide semiconductor field-effect transistor) in this example; however, the switching element Q1 may be another transistor such as an IGBT (Insulated Gate Bipolar Transistor), etc. The switching element Q1 is connected in series with the inductance L between a positive terminal and the output terminal 20. A drain of the switching element Q1 is connected to the positive terminal and a source of the switching element Q1 is connected to the inductance L. The capacitor C1 is connected in parallel with respect to the switching element Q1 and the inductance L between the positive terminal and the output terminal 20.

Similarly, the second loop circuit 12 has a switching element Q2 and a capacitor C2 in addition to the inductance L. The switching element Q2 is a MOSFET in this example; however, the switching element Q2 may be another transistor such as an IGBT, etc. The switching element Q2 is connected in series with the inductance L between a negative terminal and the output terminal 20. A drain of the switching element Q2 is connected to the inductance L and a source of the switching element Q2 is connected to the negative terminal. The capacitor C2 is connected in parallel with the switching element Q2 and the inductance L between the negative terminal and the output terminal 20.

The positive terminal is connected to a first direct-current power supply (see a direct-current power supply 203 in FIG. 12), and the negative terminal is connected to a second direct-current power supply (not shown) whose voltage is lower than that of the first direct-current power supply. A rated voltage of the first direct-current power supply and a rated voltage of the second direct-current power supply are arbitrary as long as the rated voltage of the second direct-current power supply is lower than the rated voltage of the first direct-current power supply. Typically, the negative terminal is connected to a ground (i.e., 0 V). Hereafter, in order to avoid complexity of explanation, it is assumed that the negative terminal is connected to a ground, unless otherwise specified.

Mainly, the capacitors C1 and C2 have functions of smoothing an output voltage of the voltage conversion apparatus 1 and reducing a noise level generated by the voltage conversion apparatus 1. Preferably, the capacitances of the capacitors C1 and C2 are set to the same value. Further, preferably, the capacitors C1 and C2 are ceramic capacitors, which have a high resistance against age deterioration, in order to reduce influence of the deterioration.

The switching elements Q1 and Q2 are controlled such that one of the switching elements Q1 and Q2 is turned on when the other is turned off. The details of the control manner of the switching elements Q1 and Q2 (for example, a way of setting or adjusting a dead time) may be arbitrary.

In the example shown in FIG. 3, in operation, when the switching element Q2 turns on, the switching element Q1 turns off in synchronization with it. At that time, the current I2 passes through the second loop circuit 12 in a direction indicated by an arrow in FIG. 3. When the switching element Q2 is inverted from ON state to OFF state, the switching element Q1 is also inverted from OFF state to ON state in synchronization with it. At that time, the current I1 passes through the first loop circuit 10 in a direction indicated by an arrow in FIG. 3. In this way, by appropriately controlling a time period (i.e., on-duty) for which the switching element Q2 turns on, it is possible to convert the voltage of the first direct-current power supply into a desired voltage and output it at the output terminal 20.

Figure 4:
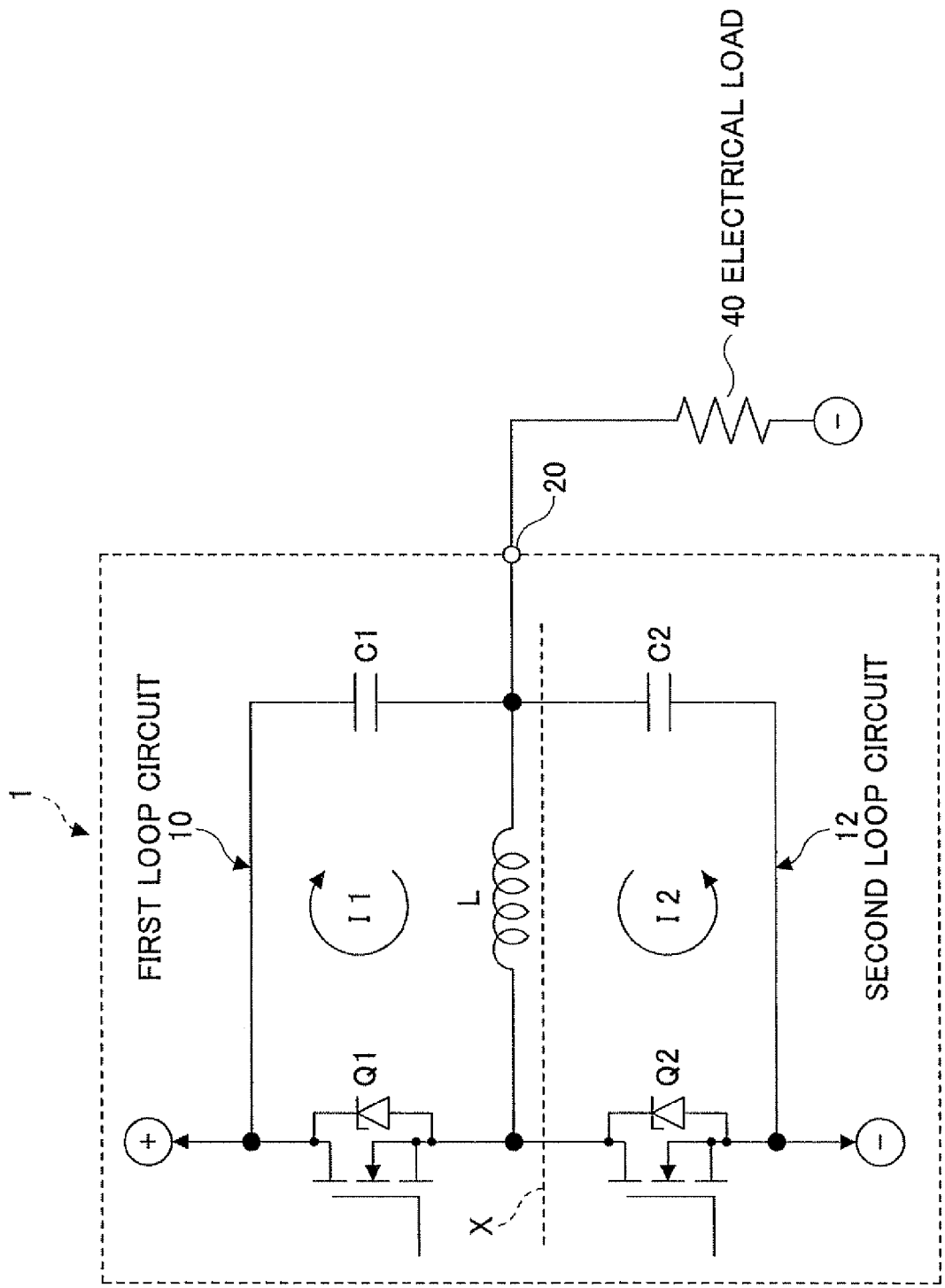
FIG. 4 is a diagram for illustrating another example of a way of connecting an electrical load 40.

It is noted that in the example shown in FIG. 3, the positive terminal is connected to another terminal of the electrical load 40 (i.e., the terminal of the electrical load 40 on an opposite side with respect to the output terminal 20). Therefore, the ON/OFF operation of the switching element Q2 substantially determines the duty ratio, and the switching element Q1 functions as a switching element for synchronous rectification. It is noted that when cost is more important than energy efficiency, for example, the switching element Q1 may be omitted. In this case, only a diode is provided instead of the switching element Q1. Further, for example, as shown in FIG. 4, the negative terminal may be connected to the other terminal of the electrical load 40 (i.e., the terminal of the electrical load 40 on an opposite side with respect to the output terminal 20). In this case, in contrast to the example shown in FIG. 3, the ON/OFF operation of the switching element Q1 substantially determines the duty ratio, and the switching element Q2 functions as a switching element for synchronous rectification. It is noted that in the example shown in FIG. 4, when cost is more important than energy efficiency, the switching element Q2 may be omitted. In this case, only a diode is provided instead of the switching element Q2.

Figure 2:
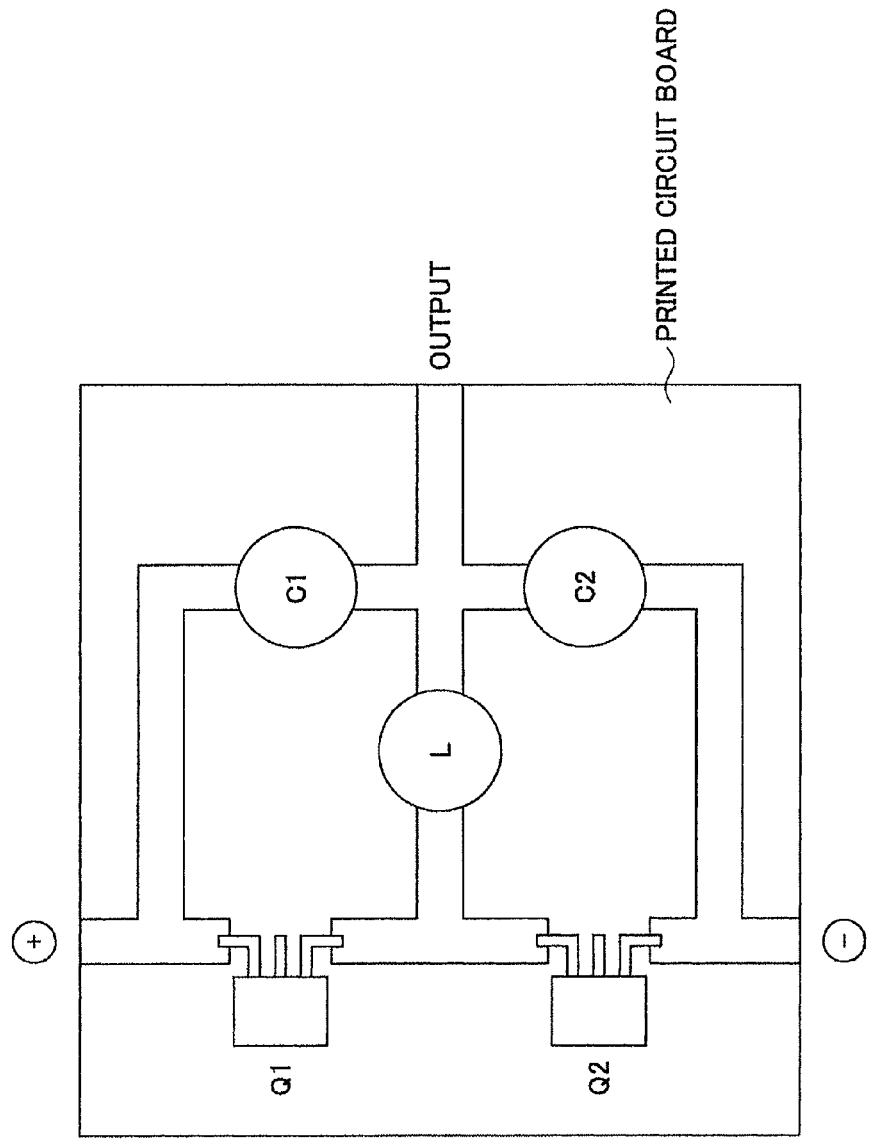
FIG. 2 is a diagram for illustrating an arrangement of parts of the DC-DC converter according to prior art.

As above-mentioned with reference to FIG. 2, if the circuit configuration of the voltage conversion apparatus 1 is disposed in a plane as it is, the magnetic field through the first loop circuit 10 and the magnetic field through the second loop circuit 12 are generated alternately in a short period. This results in high-frequency noise due to high-frequency variation in the magnetic field.

This embodiment, as described below in detail, enables effectively reducing the noise due to the magnetic field variation formed in the first and second loop circuits 10 and 12 by appropriately disposing the circuit configuration of the voltage conversion apparatus 1. This is described below in detail.

Figure 5:
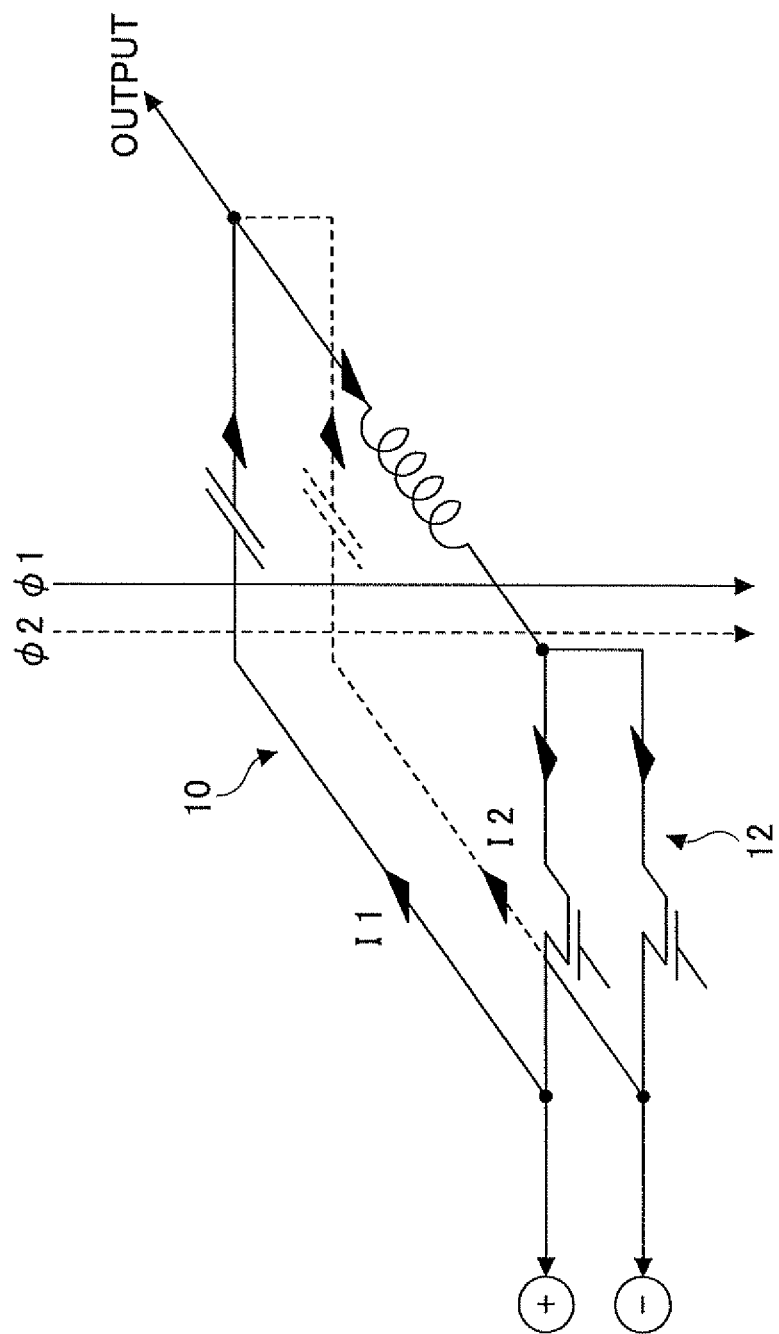
FIG. 5 is a diagram for conceptually illustrating a circuit arrangement of the voltage conversion apparatus 1 according to the embodiment of the present invention.

FIG. 5 is a diagram for conceptually illustrating a circuit arrangement of the voltage conversion apparatus 1 according to the embodiment. It is noted that the illustration of the diodes which are disposed in parallel with the switching elements Q1 and Q2 are omitted in FIG. 5 and subsequent some drawings.

In this embodiment, as shown in FIG. 5, with respect to the magnetic fluxes (and thus magnetic fields) generated alternately in connection with the on/off operation of the switching element Q2 (and thus the off/on operation of the switching element Q1 in synchronization with it), a direction of a magnetic flux $\phi 1$ through the first loop circuit 10 is configured to be equal to a direction of a magnetic flux $\phi 2$ through the second loop circuit 12. In other words, the first and second loop circuits 10 and 12 are disposed in such a manner that the first and second loop circuits 10 and 12 are opposed to each other in a direction of the normal to the first and second loop circuits 10 and 12, as shown in FIG. 5. Specifically, the first and second loop circuits 10 and 12 are disposed to be opposed to each other as if the circuit configuration in FIG. 3 were folded along a line X.

FIGS. 6A-6E are diagrams of waveshapes for explaining a magnetic flux variation reduction effect in the voltage conversion apparatus 1 which adopts the circuit arrangement shown in FIG. 5.

As mentioned above, when the switching elements Q2 and Q1 are driven with a predetermined duty ratio, the current passes through the second and first loop circuits 12 and 10 with waveshapes as shown in FIGS. 6A and 6B. At that time, because of the current passing through the second and first loop circuits 12 and 10, the magnetic flux $\phi 2$ through the second loop circuit 12 and the magnetic flux $\phi 1$ through the first loop circuit 10 are generated with waveshapes (time series) as shown in FIGS. 6C and 6D. Each of the magnetic flux $\phi 2$ and the magnetic flux $\phi 1$ varies greatly in a short time period because the switching elements Q2 and Q1 are driven at high speed. According to the embodiment, the directions of the magnetic flux $\phi 2$ and the magnetic flux $\phi 1$ shown in FIG. 6C and FIG. 6D are the same. Thus, when these waveshapes (time series) are superposed, the waveshape without a steep variation is obtained as shown in FIG. 6E. In other words, a reduced variation in a magnetic flux is implemented. In this way, according to the voltage conversion apparatus 1, it is possible to effectively reduce noise generated by a high-frequency variation in magnetic flux $\phi 1 + \phi 2$.

Figure 7:
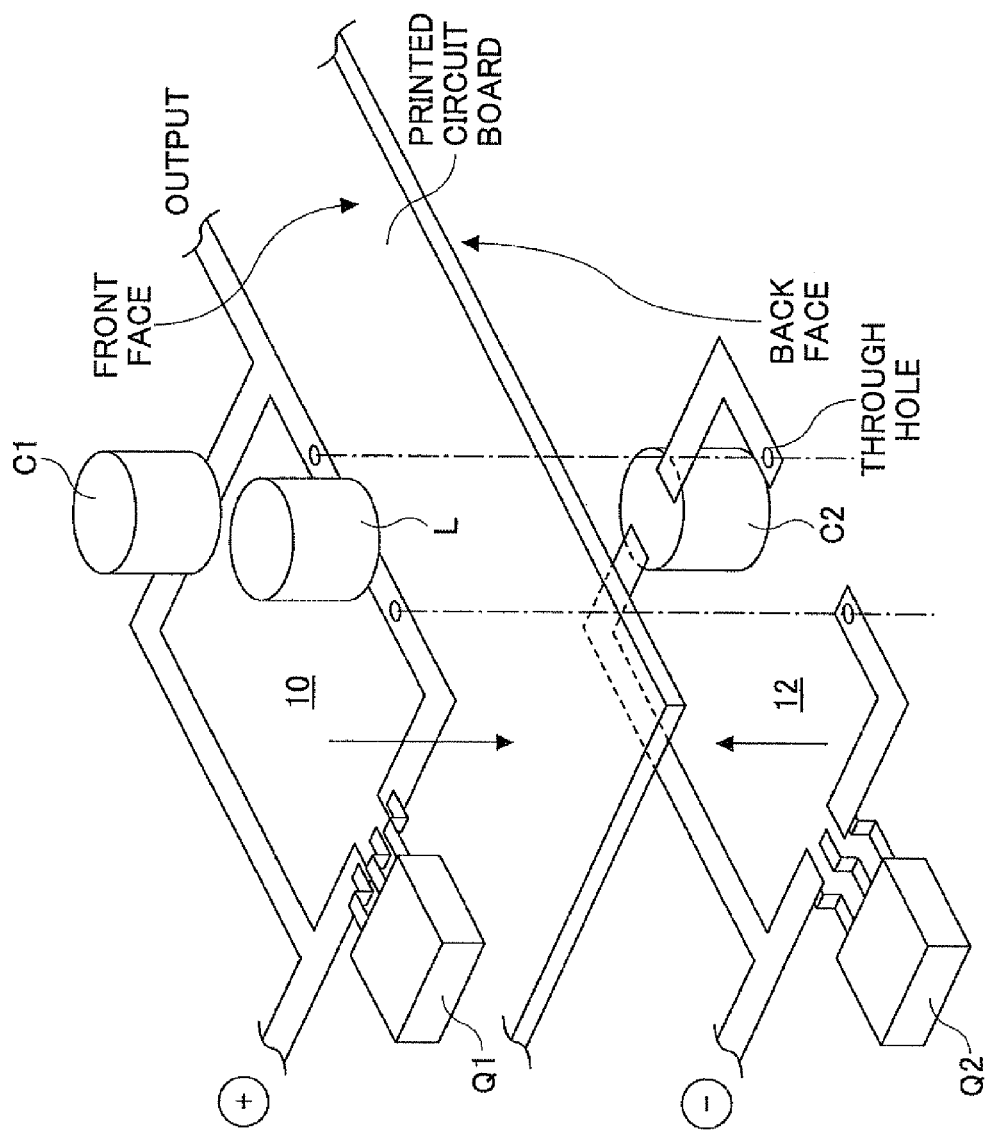
FIG. 7 is a diagram for illustrating a concrete example for implementation of the circuit arrangement of the voltage conversion apparatus 1 according to the embodiment.

FIG. 7 is a diagram for illustrating a concrete example for implementation of the circuit arrangement of the voltage conversion apparatus 1 according to the embodiment.

In the example shown in FIG. 7, the first loop circuit 10 is disposed on one side (a front face in this example) of a printed circuit board and the second loop circuit 12 is disposed on the other side (a back in this example) of the same printed circuit board. It is noted that the inductance L may be disposed on any side of the printed circuit board and be shared between the first and second loop circuits 10 and 12 via a through hole. In this example, the inductance L is disposed on a front face of the printed circuit board together with other main components of the first loop circuit 10 and is connected to the second loop circuit 12 via a through hole.

Here, in the above-mentioned configuration in which the first and second loop circuits 10 and 12 are disposed to be opposed to each other, such a positional relationship is formed in which the switching elements Q1 and Q2 in the respective first and second loop circuits 10 and 12 are opposed to each other from a front face and a back face of the printed circuit board. Such a configuration is easier to generate a concentration of heat. Considering this problem, a heat radiating arrangement for effectively radiating such heat to the outside according to the embodiment is described hereafter.

Figure 8:
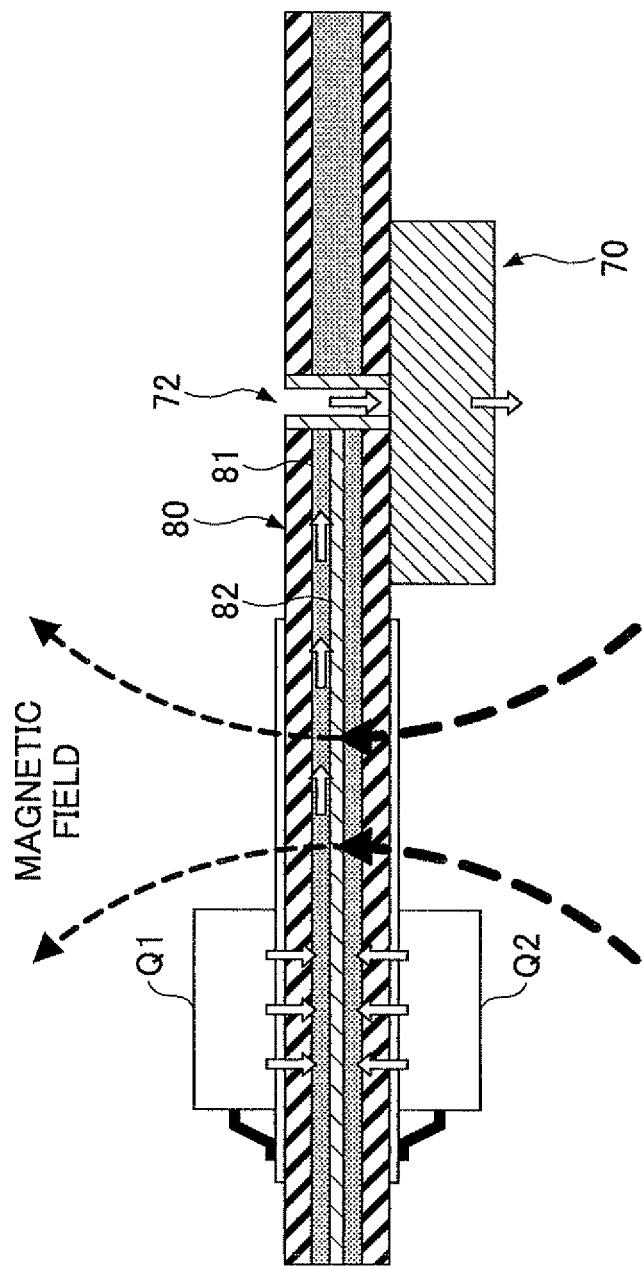
FIG. 8 is a cross-sectional view of a printed circuit board for showing an example of a way of disposing a heat sink 70.

FIG. 8 is a cross-sectional view of a printed circuit board 80 on which the first and second loop circuits 10 and 12 of the voltage conversion apparatus 1 according to the embodiment are provided. In FIG. 8, an example of a way of disposing a heat sink 70 is shown.

The heat sink 70 is provided on one of a front face and a back face (a front face in this example), as shown in FIG. 8. The heat sink 70 may be made of a heat conductive material (an aluminum block, for example). The heat sink 70 may have a fin formed thereon so as to enhance heat radiation characteristics.

The printed circuit board 80 is provided with a heat conductive layer 82 formed by a solid pattern of a metal material such as copper. In other words, the printed circuit board 80 has a heat conductive layer 82 which is made of a heat conductive material. In the illustrated example, the printed circuit board 80 includes an intermediate layer 81 formed from a prepreg, and the heat conductive layer 82 formed by a solid pattern of copper is provided in the intermediate layer 81. The heat conductive layer 82 is provided within a region, which region completely includes a footprint of the switching elements Q1 and Q2 and a footprint of the heat sink 70, when viewed from upper side along a direction of the normal to the surface of the printed circuit board 80. It is noted that in a typical case the heat conductive layer 82 is provided over an area which substantially corresponds to an area of the surface of the printed circuit board 80 as a whole.

A through hole 72 is formed in the printed circuit board 80. The through hole 72 is formed in such a manner that it passes through the heat conductive layer 82 within the footprint of the heat sink 70 when viewed from upper side along a direction of the normal to the surface of the printed circuit board 80. The through hole 72 is plated with copper, for example, so as to assure heat conductivity between the heat conductive layer 82 and the heat sink 70. In this way, the heat conductive layer 82 is connected to the heat sink 70 via the through hole 72.

In the example shown in FIG. 8, heat dissipation is performed in such a manner that heat from the switching elements Q1 and Q2 is transferred to the heat conductive layer 82 and then transferred to the heat sink 70 via the through hole 72, as shown by solid bold arrows in FIG. 8. In this way, according to the example shown in FIG. 8, even in such a construction in which heat is easily localized because the switching elements Q1 and Q2 in the respective first and second loop circuits 10 and 12 are opposed to each other from a front face and a back face of the printed circuit board 80, it becomes possible to effectively dissipate heat from the switching elements Q1 and Q2 and thus prevent localized concentration of heat.

Further, if the heat conductive layer 82 is formed by a metal layer such as a solid pattern of copper, it is possible to reduce a magnetic field thanks to the heat conductive layer 82, as conceptually indicated by arrows (bold dashed arrows) in FIG. 8. In other words, the heat conductive layer 82 has a function of reducing a change in a magnetic field through the first and second loop circuits 10 and 12 and thus can reduce the change in the magnetic field through the first and second loop circuits 10 and 12. It is noted that in FIG. 6C, FIG. 6D and FIG. 6E such a magnetic field reduction effect obtained by the heat conductive layer 82 is conceptually shown. Specifically, in FIG. 6C, FIG. 6D and FIG. 6E, a waveshape in the case of the heat conductive layer 82 not being provided is shown by a dotted line, and a waveshape in the case of the heat conductive layer 82 being provided is shown by a solid line.

Figure 9:
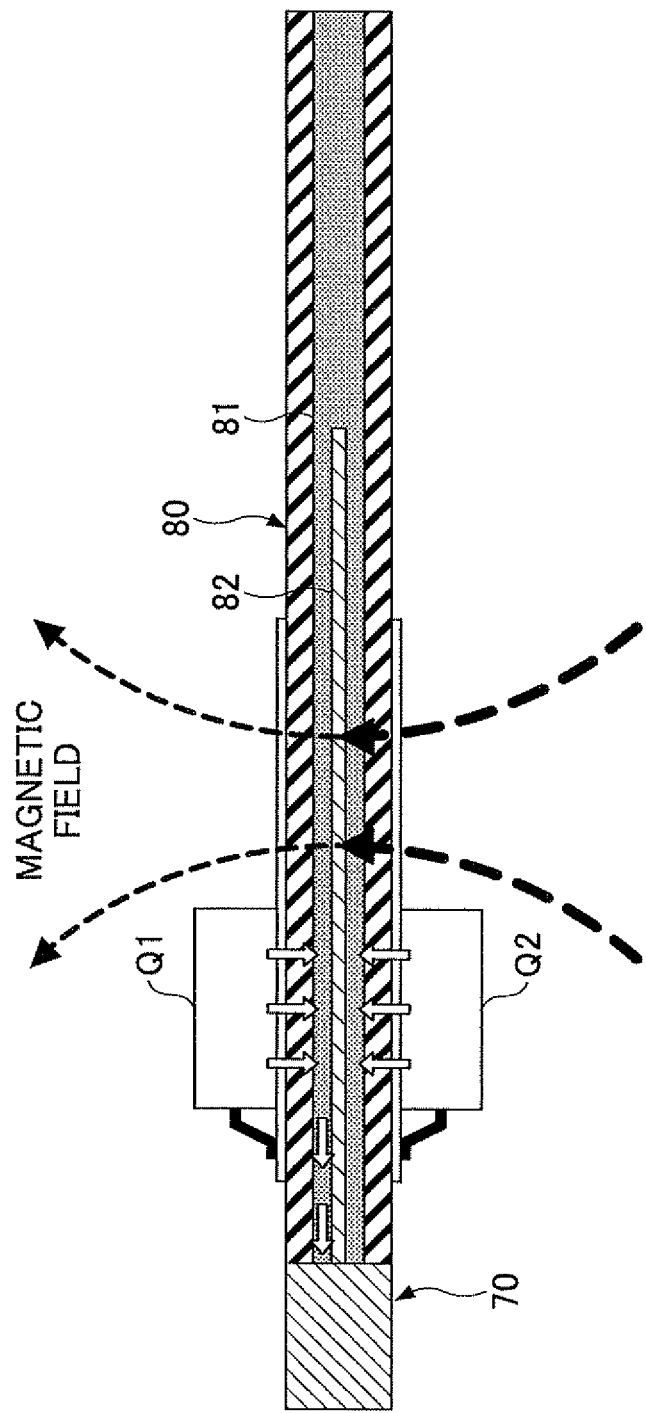
FIG. 9 is a cross-sectional view of a printed circuit board for showing another example of a way of disposing a heat sink 70.

FIG. 9 is a cross-sectional view of a printed circuit board 80 on which the first and second loop circuits 10 and 12 of the voltage conversion apparatus 1 according to the embodiment are provided. In FIG. 9, another example of a way of disposing a heat sink 70 is shown.

In the example shown in FIG. 9, the heat sink 70 is provided in such a manner that it comes in contact with a side face of the printed circuit board 80. The heat conductive layer 82 is provided in such a manner that it extends to the side face of the printed circuit board 80. In other words, the heat conductive layer 82 is provided in such a manner that it comes in contact with the heat sink 70 at the side face of the printed circuit board 80. For this reason, in the example shown in FIG. 9, a through hole 72 such as shown in the example in FIG. 8 becomes unnecessary. The heat conductive layer 82 is provided within a region, which region completely includes a footprint of the switching elements Q1 and Q2 when viewed from upper side along a direction of the normal to the surface of the printed circuit board 80. Further, in a preferred embodiment, in order to obtain the above-mentioned magnetic field reduction effect, the heat conductive layer 82 is provided within a region, which region includes the whole of the first and second loop circuits 10 and 12 when viewed from upper side along a direction of the normal to the surface of the printed circuit board 80.

In the example shown in FIG. 9, heat dissipation is performed in such a manner that heat from the switching elements Q1 and Q2 is transferred to the heat conductive layer 82 and then transferred to the heat sink 70, as shown by solid bold arrows in FIG. 9. In this way, according to the example shown in FIG. 9, even in such a construction in which heat is easy to be localized because the switching elements Q1 and Q2 in each of the first and second loop circuits 10 and 12 are opposed to each other from a front face and a back face of the printed circuit board 80, it becomes possible to effectively dissipate heat from the switching elements Q1 and Q2 and thus prevent localized concentration of heat. Further, as is the case with the example shown in FIG. 8, the heat conductive layer 82 has a function of reducing a change in a magnetic field through the first and second loop circuits 10 and 12 and thus can reduce the change in the magnetic field through the first and second loop circuits 10 and 12.

In the example shown in FIG. 9, the heat sink 70 may have another end (which is opposite to the end on the side of printed circuit board 80) coupled to a casing (not shown) of the voltage conversion apparatus 1. Alternatively, the heat sink 70 may be formed to be integral with the casing of the voltage conversion apparatus 1. In other words, the function of the heat sink 70 may be implemented by the metal casing of the voltage conversion apparatus 1.

Figure 10:
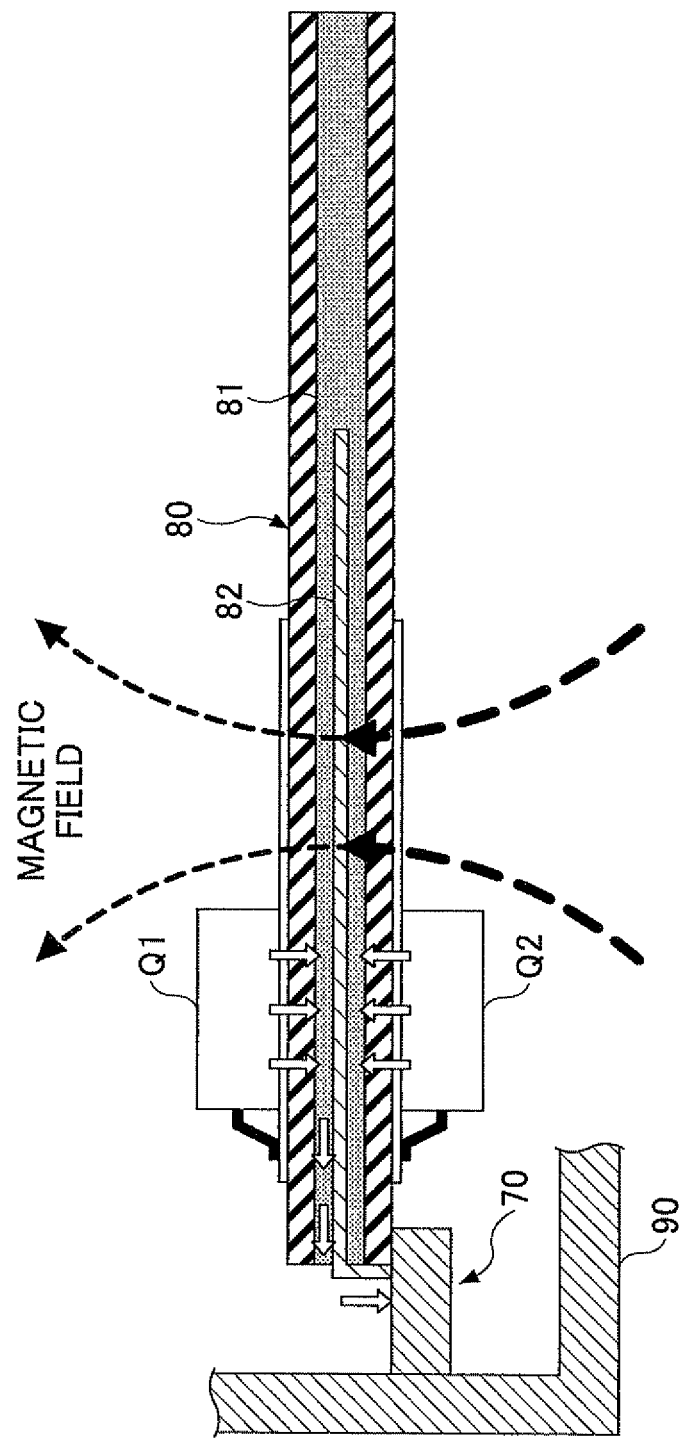
FIG. 10 is a cross-sectional view of a printed circuit board for showing yet another example of a way of disposing a heat sink 70.

FIG. 10 is a cross-sectional view of a printed circuit board 80 on which the first and second loop circuits 10 and 12 of the voltage conversion apparatus 1 according to the embodiment are provided. In FIG. 10, yet another example of a way of disposing a heat sink 70 is shown.

In the example shown in FIG. 10, the heat sink 70 is provided in relation to the side face of the printed circuit board 80 (i.e., on the side of the printed circuit board 80). However, in the example shown in FIG. 10, unlike the example shown in FIG. 9, the heat sink 70 is not in direct contact with the side face of the printed circuit board 80, but is provided in such a manner that the heat sink 70 supports one of a front face and a back face (a back face in this example) of the printed circuit board 80. A plurality of heat sinks 70, which have similar configurations, may be provided in such a manner that the respective heat sinks 70 support the corresponding edge portions of the printed circuit board 80. For example, the heat sinks 70 may be provided in such a manner that the heat sinks 70 support the edge portions of the printed circuit board 80 over the whole peripheral thereof. Further, the heat sink 70 may be fixed to the casing 90 of the voltage conversion apparatus 1, as shown in FIG. 10, or may be formed to be integral with the casing 90 of the voltage conversion apparatus 1. In the latter case, the heat sink 70 may be configured by having a portion protruding inward from the metal casing 90 of the voltage conversion apparatus 1.

The heat conductive layer 82 is provided in such a manner that it extends out from the side face of the printed circuit board 80 to the heat sink 70. In other words, the heat conductive layer 82 is provided in such a manner that it extends beyond the side face of the printed circuit board 80 and then extends downward to come in contact with the heat sink 70. For this reason, in the example shown in FIG. 10, a through hole 72 such as shown in the example in FIG. 8 becomes unnecessary. Similarly, the heat conductive layer 82 is provided within a region, which region completely includes a footprint of the switching elements Q1 and Q2 when viewed from upper side along a direction of the normal to the surface of the printed circuit board 80. Further, in a preferred embodiment, in order to obtain the above-mentioned magnetic field reduction effect, the heat conductive layer 82 is provided within a region, which region includes the whole of the first and second loop circuits 10 and 12 when viewed from upper side along a direction of the normal to the surface of the printed circuit board 80.

In the example shown in FIG. 10, heat dissipation is performed in such a manner that heat from the switching elements Q1 and Q2 is transferred to the heat conductive layer 82 and then transferred to the heat sink 70, as shown by solid bold arrows in FIG. 10. In this way, according to the example shown in FIG. 10, even in such a construction in which heat is easily localized because the switching elements Q1 and Q2 in the respective first and second loop circuits 10 and 12 are opposed to each other from a front face and a back face of the printed circuit board 80, it becomes possible to effectively dissipate heat from the switching elements Q1 and Q2 and thus prevent localized concentration of heat. Further, as is the case with the example shown in FIG. 8, the heat conductive layer 82 has a function of reducing a change in a magnetic field through the first and second loop circuits 10 and 12 and thus can reduce the change in the magnetic field through the first and second loop circuits 10 and 12.

Figure 11:
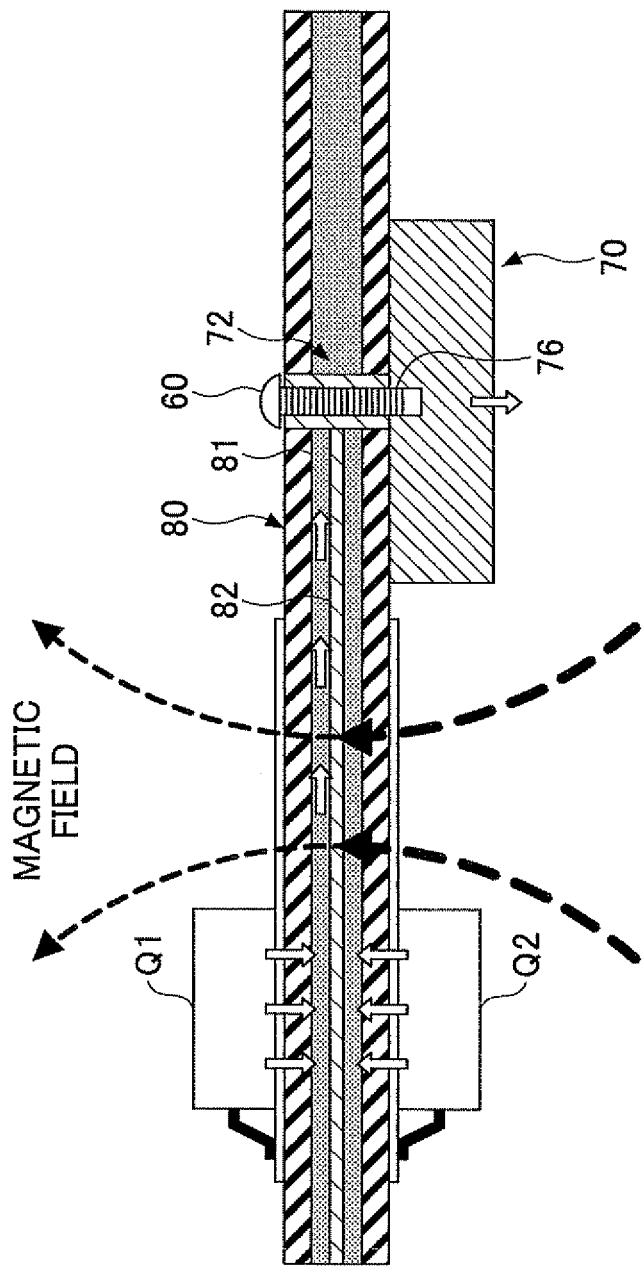
FIG. 11 is a cross-sectional view of a printed circuit board for showing an example of a way of securing a heat sink 70.

FIG. 11 is a cross-sectional view of a printed circuit board 80 for showing an example of a way of securing the heat sink 70. FIG. 11 shows a case where an example of a way of securing the heat sink 70 is applied to a way of disposing the heat sink 70 shown in FIG. 8. In the example shown in FIG. 11, the heat sink 70 is tightened and fixed by means of a screw 60 which passes through the through hole 72 formed in the printed circuit board 80. For this purpose, the heat sink 70 has an internal threaded hole formed on the side thereof opposed to the printed circuit board 80. A diameter of a head portion of the screw 60 is greater than a diameter of the through hole 72. Further, a diameter of a shaft portion of the screw 60 may be substantially the same as the diameter of the through hole 72.

Figure 12:
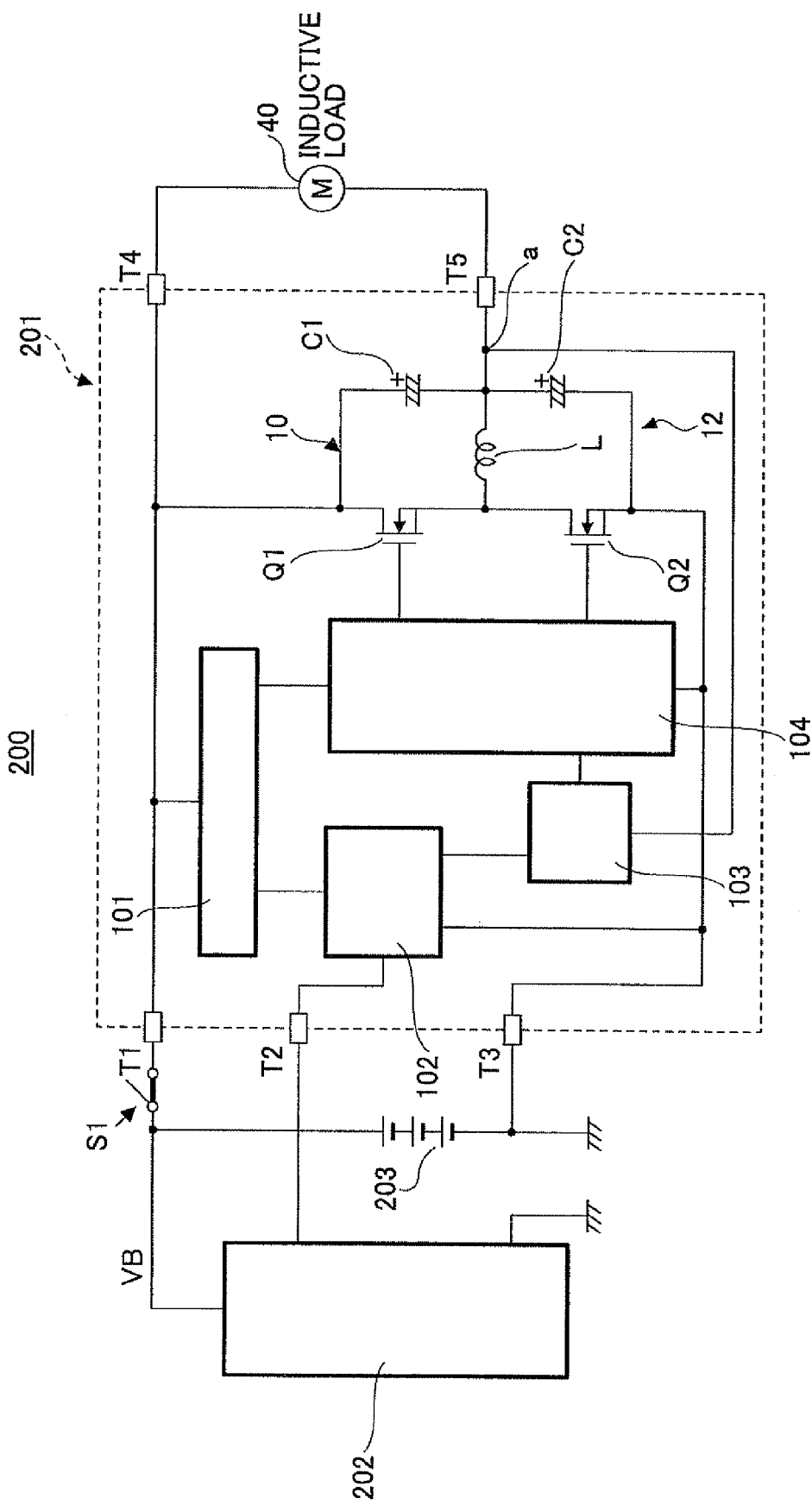
FIG. 12 is a system diagram of an embodiment of an electrical load driving apparatus 200 according to the present invention.

FIG. 12 is a system diagram of an embodiment of an electrical load driving apparatus 200 according to the present invention.

The electrical load driving apparatus 200 according to the embodiment includes an electrical load driving circuit apparatus 201, a control target signal generating apparatus (PCM) 202, and a direct-current power supply 203. The electrical load driving circuit apparatus 201 includes the voltage conversion apparatus 1 as described above, an internal power supply circuit 101, an input signal interface circuit 102, a switching duty generation circuit 103 and a switching element driving circuit 104. It is noted that terminals T1 and T4 correspond to the positive terminal described above, a terminal T3 corresponds to the negative terminal and a terminal T5 corresponds to the output terminal 20 of the voltage conversion apparatus 1.

In the example shown in FIG. 12, the electrical load 40 is an inductive load and a fuel pump used in an engine of a vehicle. However, the electrical load 40 may be an arbitrary electrical load, such as a fan, an assist motor in a steering system, etc. Further, a switch indicated by a reference symbol S1 corresponds to an ignition switch.

The control target signal generating apparatus 202 is constituted by a microcomputer. The control target signal generating apparatus 202 may be an EFI ECU which controls an engine of a vehicle, for example. The control target signal generating apparatus 202 determines a control target value (a target number of revolutions) of the fuel pump and inputs a control target signal representing the determined control target value to the electrical load driving circuit apparatus 201. It is noted that the control target signal generating apparatus 202 operates based on the power supply voltage supplied from the direct-current power supply 203; however, the control target signal generating apparatus 202 may have a step-down transformer circuit or the like therein.

The control target signal from the control target signal generating apparatus 202 is processed in the input signal interface circuit 102. A duty ratio for implementing the control target value is determined by the switching duty generation circuit 103. The switching element driving circuit 104 performs the ON/OFF control of the switching elements Q1 and Q2 according to the determined duty ratio.

The present invention is disclosed with reference to the preferred embodiments. However, it should be understood that the present invention is not limited to the above-described embodiments, and variations and modifications may be made without departing from the scope of the present invention.

For example, although in the above-mentioned embodiments a step-down type of the voltage conversion apparatus is used, a step-up type or bidirectional type of the voltage conversion apparatus may be used.

The present application is based on Japanese Priority Application No. 2009-180951, filed on Aug. 3, 2009, the entire contents of which are hereby incorporated by reference.

The invention claimed is:

1. A voltage conversion apparatus having a first loop circuit and a second loop circuit which share an inductance component, in which a current passes through the first and second loop circuits alternately in accordance with ON/OFF operation of a first switching element provided in the first loop circuit, wherein
   a direction of a magnetic field through the first loop circuit generated at the ON operation of the first switching element in the first loop circuit is the same as a direction of a magnetic field through the second loop circuit generated at the OFF operation of the first switching element in the first loop circuit subsequent to the ON operation,
   the first loop circuit and the second loop circuit are provided on a front face and a back face of a printed circuit board, respectively, in such a manner that the first loop circuit and the second loop circuit are opposed to each other in a direction normal to the respective loop circuits,
   a heat sink is provided on one of the front face or the back face of the printed circuit board, and
   a solid pattern of a metal material is provided on an inner layer of the printed circuit board, said solid pattern being connected to the heat sink via a through hole that is formed in the printed circuit board.

2. The voltage conversion apparatus as claimed in claim 1, wherein the heat sink is fixed to the printed circuit board by means of a screw which passes through the through hole.

3. A voltage conversion apparatus having a first loop circuit and a second loop circuit which share an inductance component, in which a current passes through the first and second loop circuits alternately in accordance with ON/OFF operation of a first switching element provided in the first loop circuit, wherein
   a direction of a magnetic field through the first loop circuit generated at the ON operation of the first switching element in the first loop circuit is the same as a direction of a magnetic field through the second loop circuit generated at the OFF operation of the first switching element in the first loop circuit subsequent to the ON operation,
   the first loop circuit and the second loop circuit are provided on opposite sides of a printed circuit board, respectively, in such a manner that the first loop circuit and the second loop circuit are opposed to each other in a direction normal to the respective loop circuits,
   a heat sink is provided on a side face of the printed circuit board, the side face being perpendicular to surfaces on which the first loop circuit and the second loop circuit are provided, and
   a solid pattern of a metal material is provided on an inner layer of the printed circuit board, said solid pattern being connected to the heat sink.

4. The voltage conversion apparatus as claimed in claim 3, wherein the heat sink is fixed to a casing of the voltage conversion apparatus or is integral with the casing, and the heat sink is provided in such a manner that it supports an edge of the printed circuit board.

5. An electrical load driving apparatus for driving an electrical load, comprising:
   a direct-current power supply;
   the voltage conversion apparatus as claimed in claim 1 configured to convert a level of a voltage from the direct-current power supply and output the converted voltage to the electrical load; and
   a controller configured to control the voltage conversion apparatus.

6. An electrical load driving apparatus for driving an electrical load, comprising:
   a direct-current power supply;
   the voltage conversion apparatus as claimed in claim 3 configured to convert a level of a voltage from the direct-current power supply and output the converted voltage to the electrical load; and
   a controller configured to control the voltage conversion apparatus.

* * * * *